(12) United States Patent
Kashiwakura

(10) Patent No.: US 11,345,573 B2
(45) Date of Patent: May 31, 2022

(54) DOOR INTERLOCK

(71) Applicant: FUJITEC CO., LTD., Hikone (JP)

(72) Inventor: Hiroshi Kashiwakura, Hikone (JP)

(73) Assignee: FUJITEC CO., LTD., Hikone (JP)

( * ) Notice: Subject to any disclaimer, the term of this patent is extended or adjusted under 35 U.S.C. 154(b) by 37 days.

(21) Appl. No.: 17/131,913

(22) Filed: Dec. 23, 2020

(65) Prior Publication Data

US 2021/0300727 A1 Sep. 30, 2021

(30) Foreign Application Priority Data

Mar. 26, 2020 (JP) .............................. JP2020-055629

(51) Int. Cl.
*B66B 13/18* (2006.01)
*F16P 3/08* (2006.01)

(52) U.S. Cl.
CPC ................ *B66B 13/18* (2013.01); *F16P 3/08* (2013.01)

(58) Field of Classification Search
CPC .......... B66B 13/18; B66B 13/20; B55B 13/22
See application file for complete search history.

(56) References Cited

U.S. PATENT DOCUMENTS 6,474,448 B1 * 11/2002 Zappa ..................... B66B 13/20
187/310

FOREIGN PATENT DOCUMENTS

| JP | S61154272 U | | 9/1986 |
| JP | 02233493 A | * | 9/1990 |
| JP | 2015016949 A | * | 1/2015 |
| JP | 2016222411 A | * | 12/2016 |
| JP | 2019018951 A | * | 2/2019 |
| KR | 200481777 Y1 | * | 11/2016 |
| KR | 200482807 Y1 | * | 3/2017 |
| WO | WO-2018166405 A1 | * | 9/2018 ............. B66B 13/18 |

* cited by examiner

*Primary Examiner* — Diem M Tran
(74) *Attorney, Agent, or Firm* — The Webb Law Firm

(57) ABSTRACT

A door interlock of the present invention includes an engaged part and an engaging part configured to lock a door in a door closed state. The engaging part includes: a locking member; a mounting member mounted to the locking member; a sim member inserted into a slit; a first fixing member; and a second fixing member. The first fixing member is configured to be inserted into a first lock through hole, a first sim through hole, and a mount through hole, thereby fixing the mounting member and the sim member to the locking member. The second fixing member is configured to be inserted into a second lock through hole and a second sim through hole, thereby fixing the sim member to the locking member.

20 Claims, 21 Drawing Sheets

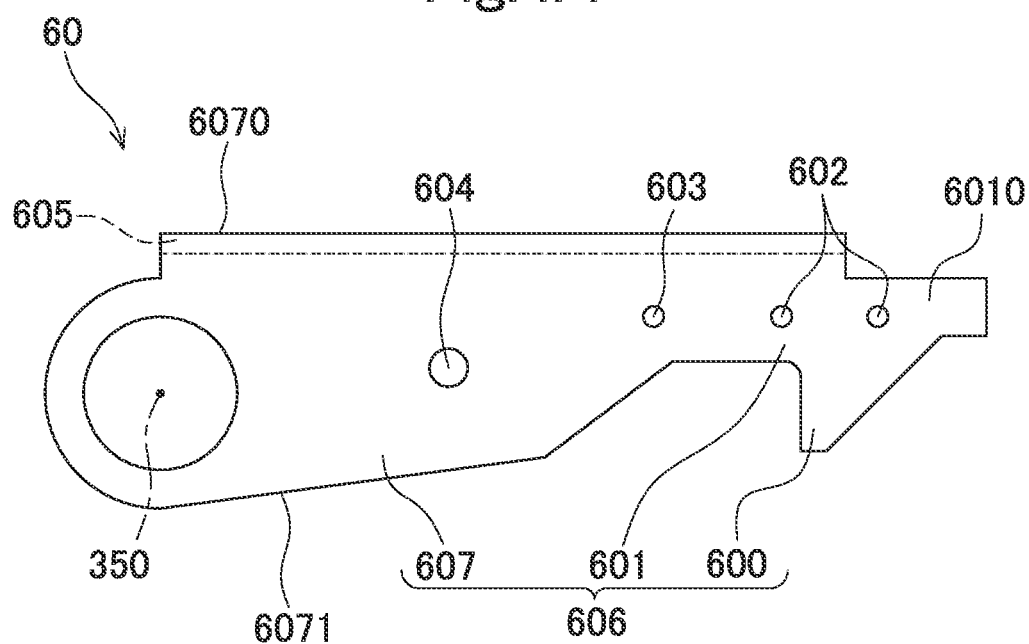

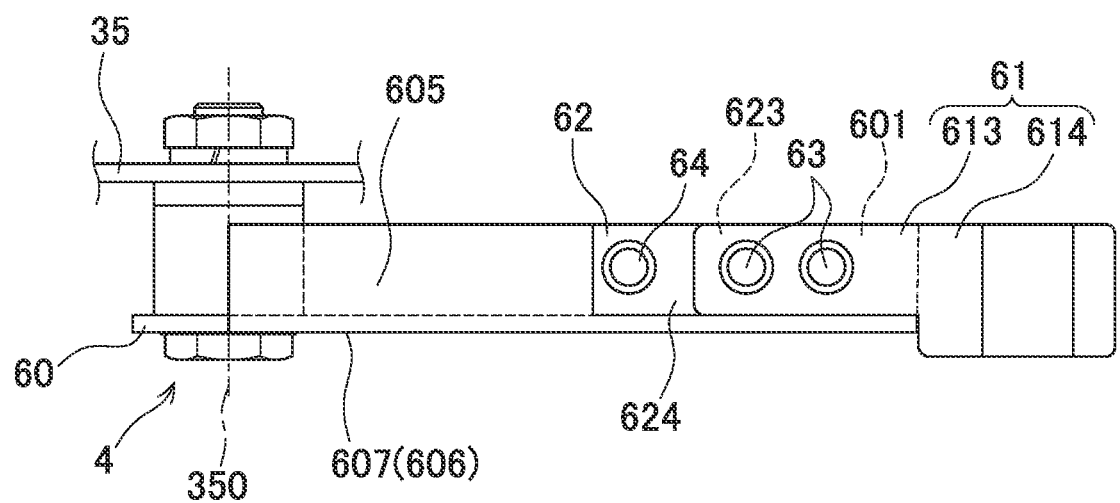

DOOR INTERLOCK

CROSS-REFERENCE TO RELATED APPLICATION

This application claims priority to Japanese Patent Application No. 2020-055629 filed Mar. 26, 2020, the disclosure of which is hereby incorporated by reference in its entirety.

BACKGROUND OF THE INVENTION

Field of the Invention

The present invention relates to a door interlock configured to be able to lock a landing door or a car door in a fully-closed state in an elevator.

Description of Related Art

Conventionally, there has been known a so-called interlock which is a mechanism for preventing a landing door from being opened from a platform side when a car does not land on the platform (JP S61-154272 U). The interlock includes a locking mechanism that is able to lock the landing door in a fully-closed state and a detector that detects whether the landing door is in a locked state or in an unlocked state.

The locking mechanism includes a locking member (actuating body) that changes its posture between an opening posture (unengaging posture) and an engaging posture in association with the opening and closing of the car door, an engaged part (fixed piece) that engages with the locking member that has come into the engaging posture upon the closing of the car door, and a mounting member (projection) to which the locking member is mounted. The locking member is connected to a landing door hanger from which the landing door is suspended. The engaged part is connected to a guide rail that guides the landing door. The mounting member is screwed to the locking member. The mounting member includes a short-circuiting contact that short-circuits contact points when the locking member has come into the engaging posture, thereby electrically confirming that the landing door is in the locked state.

According to the locking mechanism, when the car door is in the closed state, the locking member in the engaging posture engages with the engaged part, thereby locking the landing door. Thus, the landing door does not open even if, for example, a passenger or the like tries to open the landing door when the elevator stops between the floors. On the other hand, when the car door opens, the engaged part is released from the engagement with the locking member that has come into the opening posture in association with the opening of the car door. Thereby, the landing door is unlocked.

There is a case where a mounting member is provided with a slit that can allow one end of a locking member to be arranged in the slit. In the case where such a mounting member provided with a slit is used, the mounting member the locking member or the like is sometimes designed to generate a gap between the one end of the locking member and the mounting member in order to absorb dimension errors due to errors in manufacturing the locking member, the mounting member or the like. For assembling the locking mechanism using the locking member, the mounting member and the like designed in this manner, a sim member may be arranged between the one end of the locking member and the mounting member and then the sim member is fastened together with the locking member and the mounting member by screws. On the other hand, there may be a likelihood of situations where the replacement of the mounting member after the mounting of the thus configured locking mechanism to the platform for the purpose of maintenance or the like necessitates a work in such a narrow space, which makes it hard to put the hands therein, and, as a result of that the mounting member is unscrewed to be removed from the locking member, the sim member screwed to the lock member, which is unscrewed as well, may not be prevented from dropping into an elevator shaft or the like because of such a narrow space. Meanwhile, the interlock with this locking mechanism can be employed not only for the landing door but also for the car door.

SUMMARY OF THE INVENTION

It is an object of the present invention is to provide a door interlock enabling ease of mounting or removing of parts or members that constitute a locking mechanism.

For improving the basic understanding on the some features of the invention of the present application, a brief summary of the present invention will be described below. This summary does not show the outline of the present invention, and is not intended to specify the main or important features of the present invention or to limit the scope of the present invention. The purpose thereof is only to provide some of basic concepts of the invention in a simplified style as a premise of the subsequent detailed description of the invention.

A door interlock of the present invention including: an engaged part that is fixed to an elevator car or a landing platform; an engaging part that is fixed to a door that opens and closes an entrance of the car or the platform and is configured to engage with the engaged part, thereby locking the door in a door closed state, the engaging part including: a locking member that includes an engagement portion that is connected to the door and engageable with the engaged part; a mounting member that includes a slit and a detector or a part of the detector for detecting whether the door is in an opened state or a closed state, and is mounted to the locking member while having a lock insertion part, which is a part of the locking member, inserted into the slit; a sim member that is inserted into the slit while being overlapped with the lock insertion part in a width direction of the slit; a first fixing member that fixes the mounting member and the sim member to the locking member; and at least one second fixing member that fixes the sim member to the locking member, the locking member including: a first lock through hole that extends through the lock insertion part along the width direction of the slit; and at least one second lock through hole that is located at a position different from the position of the first lock through hole and extends through the locking member in a given direction, the sim member including: a first sim through hole that is located at a position overlapping with the first lock through hole and extends through the sim member in a same direction as the first lock through hole; and at least one second sim through hole that is located at a position overlapping with the at least one second lock through hole and extends through the sim member in a same direction as the at least one second lock through hole, the mounting member including a mount through hole that overlaps with the first lock through hole and the first sim through hole at a position overlapping with the lock insertion part and the sim member and extends through the mounting member in a same direction as the first lock through hole and the first sim through hole, the first fixing member configured to be inserted into the first lock through hole, the first sim through hole, and the mount through hole, thereby fixing the mounting member and the sim member to the locking member, and the at least one second fixing member configured to be inserted into the at least one second lock through hole and the at least one second sim through hole, thereby fixing the sim member to the locking member.

The door interlock may be configured such that the sim member includes a sim insertion part to be inserted into the slit, and the at least one second sim through hole is arranged at a position different from the sim insertion part of the sim member.

The door interlock may be configured such that it further includes a support member that is fixed to either one of the car, the platform, or the door, wherein the locking member is configured to be able to change its posture between an engaging posture in which the engagement portion engages with the engaged part and an unengaging posture in which the engagement portion does not engage with the engaged part, the locking member includes a lock projecting part projecting along a horizontal direction when the locking member is in the engaging posture, and the support member includes a support part that is located below the lock projecting part to be able to support the lock projecting part from below when the locking member is in the engaging posture.

The door interlock may be configured such that the locking member includes a plate-shaped lock body, and the lock projecting part may have a plate shape and extend from the lock body in a direction crossing a plane direction of the lock body.

The door interlock may be configured such that the at least one second fixing member includes a single second fixing member, the at least one second lock through hole of the locking member includes a single second lock through hole, and the at least one second sim through hole of the sim member includes a single second sim through hole.

The door interlock may be configured such that the first lock through hole has an inner periphery defining the first lock through hole and provided with a female screw into which the first fixing member is able to be screwed, the at least one second lock through hole has an inner periphery defining the at least one second lock through hole and provided with a female screw into which the at least one second fixing member is able to be screwed, each of the first sim through hole and the at least one second sim through hole is a circular hole, the female screw formed in an inner periphery of the first lock through hole has a root diameter smaller than a diameter of the first sim through hole, and the female screw formed in an inner periphery of the at least one second lock through hole has a root diameter smaller than a diameter of the at least one second sim through hole.

BRIEF DESCRIPTION OF THE DRAWINGS

The aforementioned features and the other features of the present invention will be clarified by the following description and figures illustrating the embodiments of the present invention.

FIG. 4A is a front view of a locking member of the door interlock.

FIG. 7B is a plan view of the locking member and the surroundings thereof according to the variation.

DESCRIPTION OF THE INVENTION

Hereinafter, an embodiment of the present invention will be described with reference to FIG. 1 to FIG. 6.

Figure 1:
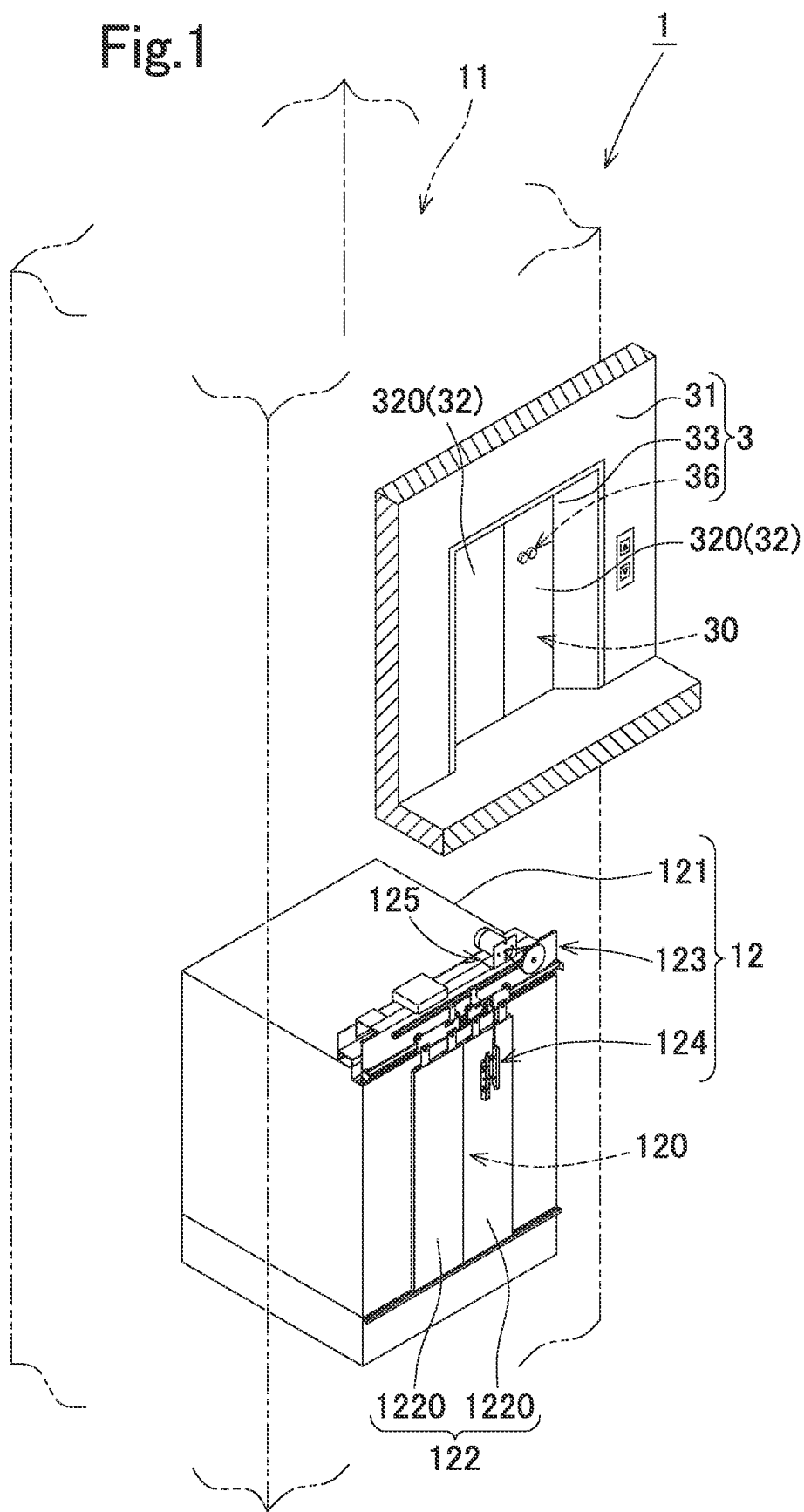
FIG. 1 is a schematic view showing a configuration of an elevator to which a door interlock according to this embodiment is mounted.

As shown in FIG. 1, a door interlock according to this embodiment is mounted to an elevator 1 including an elevator shaft 11 that extends in the vertical direction throughout a plurality of floors in a building, and a car 12 that is raised or lowered within the elevator shaft 11. The door interlock of this embodiment is, for example, a landing door interlock used for a platform 3.

The car 12 includes a car body 121 having an entrance 120, and a car door device 123 having a car door 122 and arranged in the car body 121. The car 12 further includes a door engagement device 124 mounted to the car door 122.

The car door 122 includes two door panels 1220 that can move toward and away from each other in the opening and closing direction. Each of the two door panels 1220 has a panel shape having a vertically elongated rectangular shape.

The car door device 123 includes a driving device 125 or the like that drives the car door 122. The driving device 125 drives the car door 122 in the opening and closing direction.

The door engaging device 124 is configured to, when the car 12 lands on a desired floor (landing floor), engage with a door engaged device 36 connected to a landing door 32 of the platform 3 of the landing floor. The door engaging device 124 is configured to engage with the door engaged device 36, thereby making the landing door 32 follow the motion of the car door 122 when the car door 122 opens and closes.

The platform 3 includes a platform body 31 having an entrance 30, and a landing door device 33 including the car door 32 and arranged in the platform body 31. The platform 3 further includes the door engaged device 36 mounted to the landing door 32.

Figure 2:
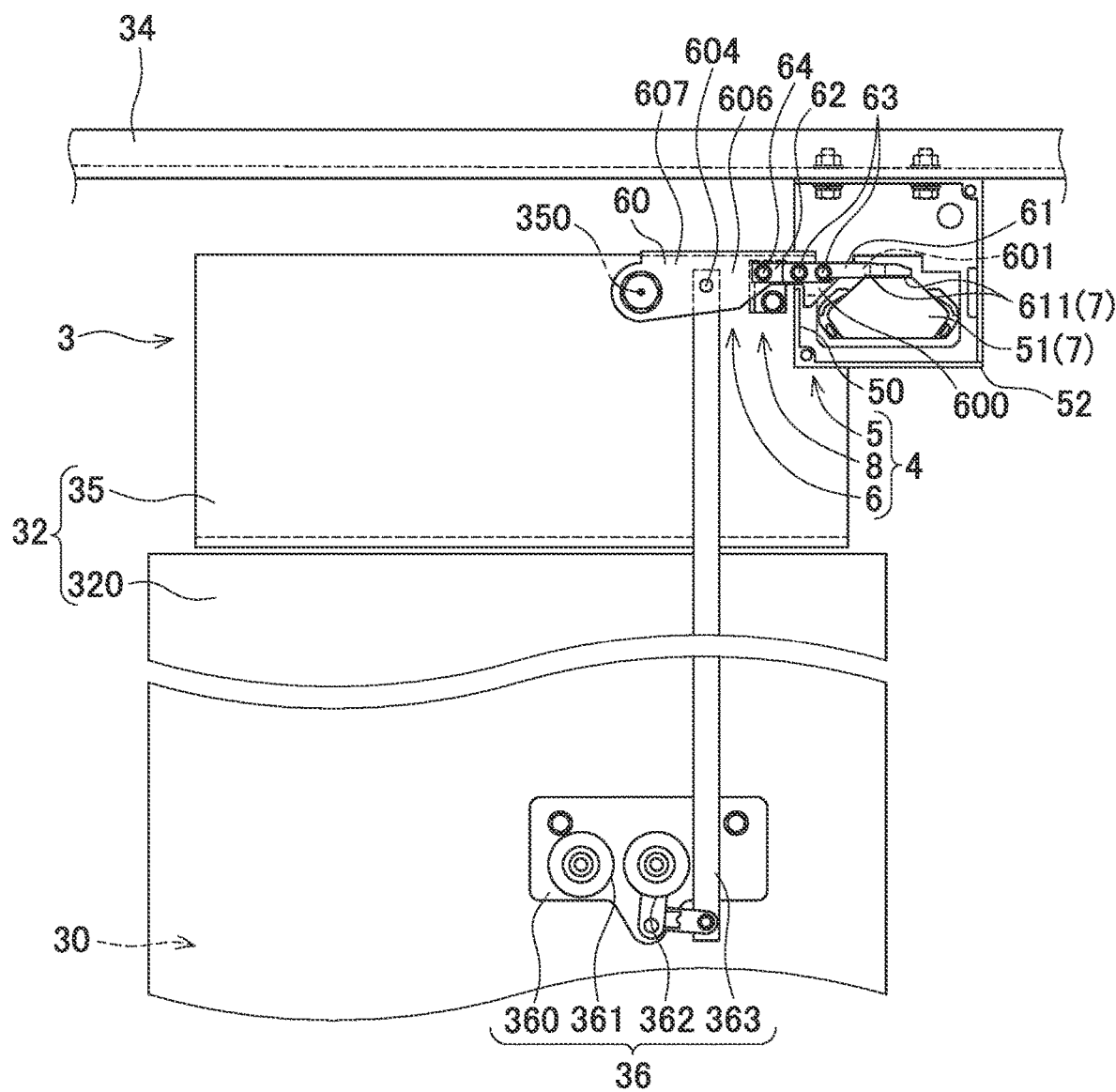
FIG. 2 is a front view of a door hanger to which the door interlock is mounted and surroundings thereof.

As shown in FIG. 2, the landing door device 33 includes, in addition to the landing door 32 configured to open and close the entrance 30, a guide rail 34 that extends in the width direction (opening and closing direction of the landing door 32 and the car door 122: hereinafter also referred to as "door opening and closing direction") above the entrance 30 of the platform 3. The landing door device 33 further includes a landing door interlock 4 configured to be able to lock the landing door 32 in the door closed state. The landing door device 33 of this embodiment is a so-called center open type door device.

The landing door 32 includes two door panels 320 that can move toward and away from each other in the opening and closing direction, and a door hanger 35 that allows the door panels 320 to move while allowing the door panels 320 to hang down therefrom (see FIG. 1 and FIG. 2). Each of the door panels 320 has a panel shape having a vertically elongated rectangular shape.

The guide rail 34 extends in the door opening and closing direction above the entrance 30 of the platform body 31 to guide the door panels 320 (specifically, the door hanger 35 with the door panels 320 hanging down therefrom) (see FIG. 2). The guide rail 34 of this embodiment guides each of the two door panels 320.

The door hanger 35 is reciprocatable along the guide rail 34 while having the door panels 320 directly or indirectly hanging down therefrom.

The door engaged device 36 transmits driving force to open and close the car door 122 to the landing door 32. The door engaged device 36 is mounted to an opposite surface of the landing door 32 facing the car door 122. The door engaged device 36 of this embodiment includes a mount plate 360 mounted to the landing door 32, a pair of catch rollers 361, 362 projecting from the mount plate 360 toward the car 12 side, and a transmission member 363 connected to the catch roller 362 which is one of the pair of catch rollers 361, 362 (specifically, the catch roller 362 on the right side in FIG. 2).

The pair of catch rollers 361, 362 of this embodiment is configured to engage with the door engaging device 124 when the car 12 lands on a desired floor, thereby transmitting driving force to open and close the car door 122 to the landing door 32. The catch rollers 361, 362 are arranged, for example, in alignment with each other in such a manner as to be movable toward and away from each other in the door opening and closing direction.

According to the door engaged device 36 of this embodiment, the transmission member 363 is located on the upper side when the catch rollers 361, 362 are located close to each other in the door opening and closing direction. When the catch rollers 361, 362 move away from each other in the door opening and closing direction, the transmission member 363 moves to the lower side by the movement of the catch roller 362 on the right side.

The landing door interlock 4 is a locking mechanism that is able to lock the landing door 32 in the closed state. The landing door interlock 4 includes an engaged part 5 fixed to the platform 3 of the elevator 1 and an engaging part 6 configured to engage with the engaged part 5. The landing door interlock 4 of this embodiment includes a detector 7 for detecting whether the door is in the opened state or the closed state. The landing door interlock 4 of this embodiment further includes a support member 8 fixed to the door hanger 35.

The landing door interlock 4 of this embodiment includes an engaging part 6 including a locking member 60, and an engaged part 5 including an engaged member 50 configured to engage with the locking member 60 that has come into the engaging posture by the closing of the landing door 32. According to this landing door interlock 4, the locking member 60, which has come into the engaging posture by the closing of the landing door 32, engages with the engaged member 50, thereby causing the landing door 32 to be locked. On the other hand, the locking member 60 comes into the unengaging posture by the opening of the landing door 32, thereby causing the engaged part 50 to be released from the engagement with the locking member 60. Thereby, the locking state is released. A specific description will be given for the configurations of the engaged member 50, the locking member 60, and the like.

The engaging part 6 is fixed to the landing door 32 that opens and closes the entrance 30 of the platform 3 and configured to engage with the engaged part 5 to lock the landing door 32 in the door closed state. The engaging part 6 of this embodiment is mounted to the door hanger 35 connected to one of the two door panels 320.

Figure 3A:
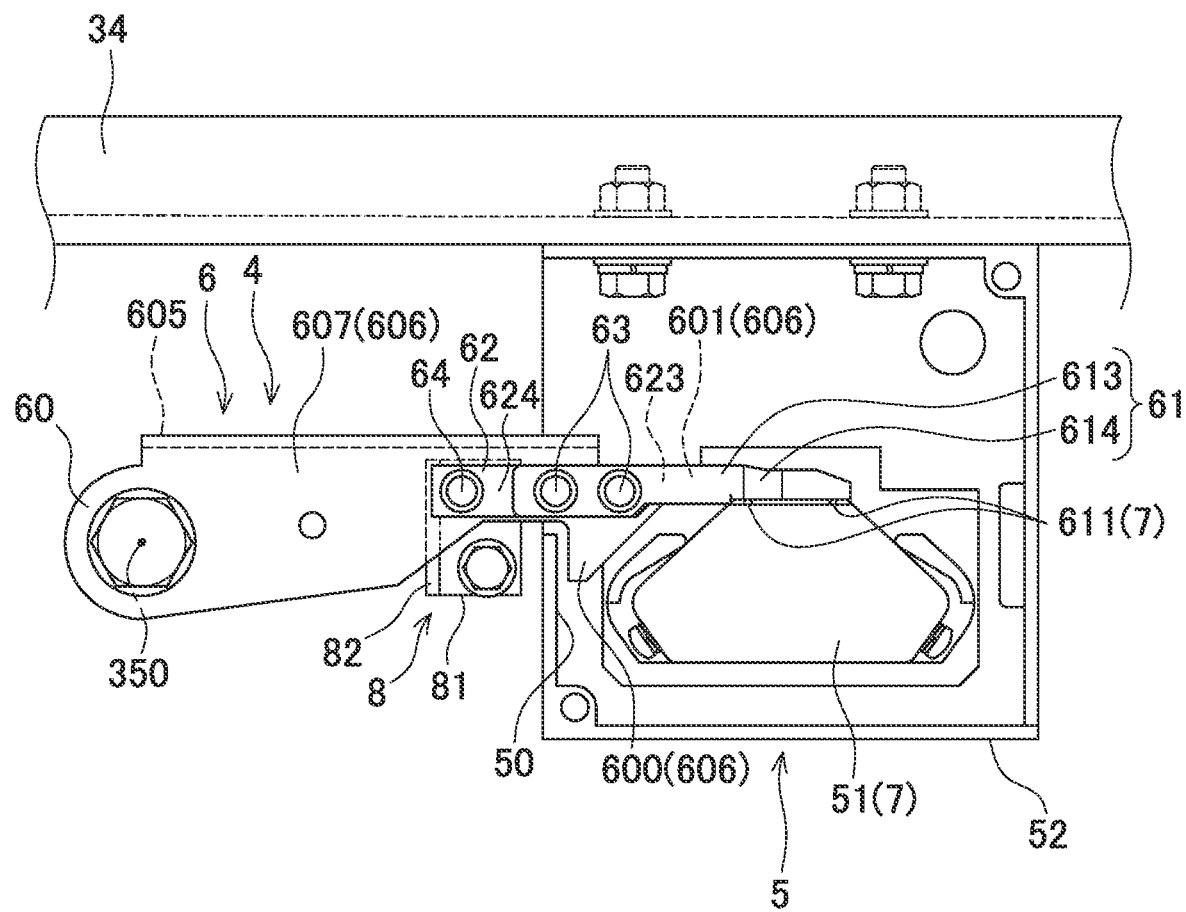
FIG. 3A is an enlarged view of the door interlock of FIG. 2.
Figure 3B:
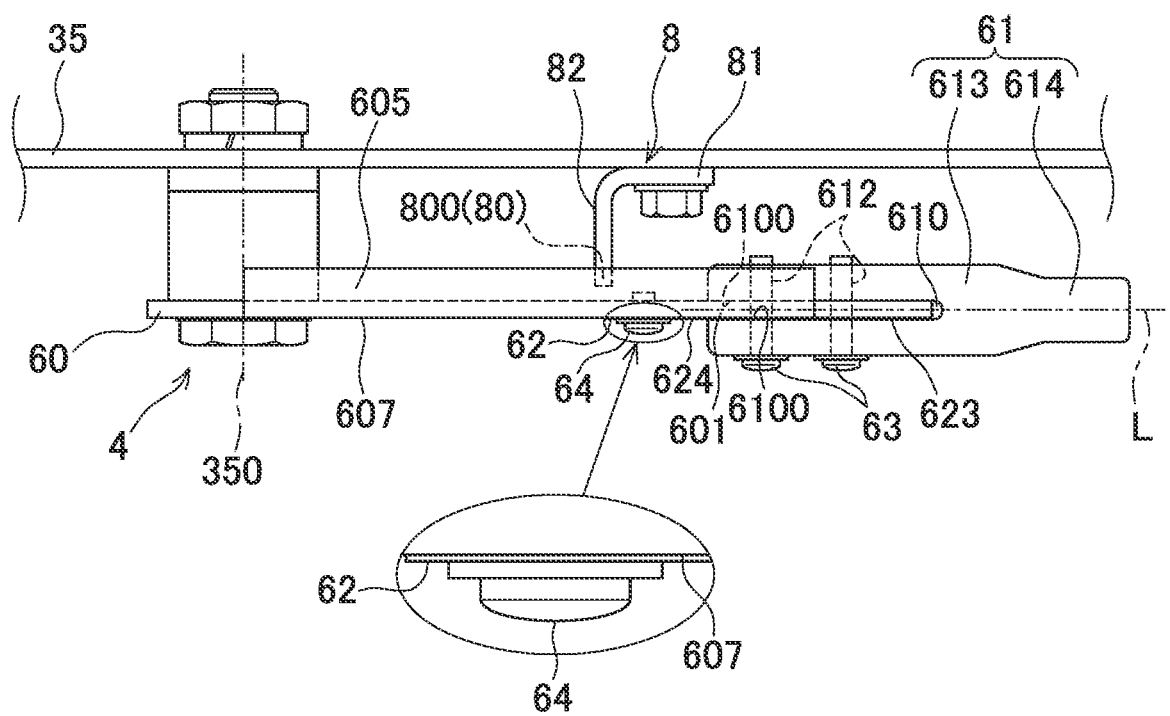
FIG. 3B is a plan view of a door hanger to which the door interlock is mounted and surroundings thereof.

Further, the engaging part 6 changes its posture between the unengaging posture and the engaging posture in association with the opening and closing of the landing door 32. As shown in FIG. 3A and FIG. 3B, the engaging part 6 further includes the locking member 60, a sim member 62 arranged overlapping with the locking member 60, and a mounting member 61 having a slit 610 into which the locking member 60 and the sim member 62 overlapping with each other are inserted. The engaging part 6 further includes a first fixing member 63 that fixes the mounting member 61 and the sim member 62 to the locking member 60, and a second fixing member 64 that fixes the sim member 62 to the locking member 60.

The locking member 60 is a member for engagement with the engaged part 5. For example, the locking member 60 of this embodiment is connected to the landing door 32 via the door hanger 35 (see FIG. 2). Also, the locking member 60 is connected to the transmission member 363 of the door engaged device 36.

As shown in FIG. 3A and FIG. 4A, the locking member 60 also includes an engagement portion 600 that is connected to the landing door 32 and is engageable with the engaged part 5, and a first lock through hole 602, through which the first fixing member 63 is inserted, and a second lock through hole 603, through which the second fixing member 64 is inserted. The locking member 60 of this embodiment has multiple first lock through holes 602 (specifically, two first lock through holes 602 in this embodiment) and a single second lock through hole 603. The locking member 60 of this embodiment also has a third lock through hole 604 used for connection to the transmission member 363 of the door engaged device 36. The locking member 60 of this embodiment further includes a lock projecting part 605. The locking member 60 also includes a plate-shaped lock body 606. In this embodiment, two first fixing members 63 are provided to conform to the arrangement of the two first lock through holes 602.

The locking member 60 of this embodiment has an elongated shape. The locking member 60 is arranged to have a longitudinal direction coincident with the door opening and closing direction (see FIG. 2).

The locking member 60 can change its posture between the engaging posture at which the engagement portion 600 engages with the engaged part 5, and the unengaging posture (opening posture) at which the engagement portion 600 does not engage with the engaged part 5. The locking member 60 of this embodiment can take the engaging posture and the unengaging posture by the vertical movement of the transmission member 363 of the door engaged device 36 in association with the opening and closing of the car door 122. For example, the locking member 60 takes the unengaging posture when the transmission member 363 is located on the upper side, and takes the engaging posture when the transmission member 363 is located on the lower side.

The locking member 60 of this embodiment is pivotally arranged on the door hanger 35. Specifically, the locking member 60 is connected to a shaft 350 so as to be pivotable around the shaft 350 extending from the door hanger 35. The locking member 60 can change its posture from the engaging posture shown in FIG. 2 to the unengaging posture by the pivotal movement around the shaft 350 in the counterclockwise direction.

Generally, the locking member 60 is kept out of contact with the support member 8 even in the engaging posture. However, the locking member 60 contacts with the support member 8 when a force is applied to the locking member 60 from above.

The lock body 606 has a plate shape extending along the plane perpendicular to the shaft 350. The lock body 606 of this embodiment extends along the door hanger 35. The lock body 606 of this embodiment further includes a lock insertion part 601 on one end (end located on one side (right side in FIG. 2)) in the door opening and closing direction, the engagement portion 600 downwardly extending from the lock insertion part 601, and a lock base 607 located on the other end side in the door opening and closing direction.

Figure 4B:
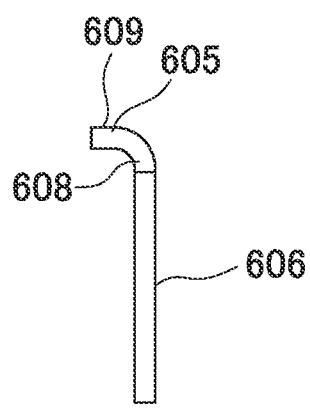
FIG. 4B is a side view of the locking member.

The lock projecting part 605 in the engaging posture of this embodiment projects along the horizontal direction (see FIG. 4B). Specifically, the lock projecting part 605 has a plate shape and extends from the lock body 606 in a direction crossing the plane direction of the lock body 606. More specifically, the lock projecting part 605 extends in a direction orthogonal to the plane direction of the lock body 606.

As described above, the locking member 60 of this embodiment has a shape in which an upper end 608 located on the upper side of the locking member 60 in the engaging posture is curved to extend in the horizontal direction. The thickness of the locking member 60 of this embodiment is constant at any part. An upper surface 609 located on the upper side of the locking member 60 in the engaging posture is a surface without an angular portion (for example, either a flat surface or a curved surface).

The lock insertion part 601 is covered with the mounting member 61 as viewed from the depth direction of the car 12 (that is, the direction orthogonal to the door opening and closing direction, hereinafter also simply referred to as "depth direction") (see FIG. 3A). The size of the lock insertion part 601 of this embodiment in the longitudinal direction of the locking member 60 is smaller than the size of the lock base 607 in the longitudinal direction (see FIG. 4A). The size of the lock insertion part 601 in the short direction of the locking member 60 is smaller than the size of the lock base 607 in the short direction.

The lock base 607 is exposed from the mounting member 61 as viewed from the depth direction (see FIG. 3A). In the lock base 607 of this embodiment, an upper edge located on the upper side of the locking member 60 in the engaging posture has a horizontal portion 6070 extending in the door opening and closing direction (see FIG. 4A). In the lock base 607 of this embodiment, a lower edge of the locking member 60 in the engaging posture has an inclined portion 6071 inclined relative to the door opening and closing direction.

The inclined portion 6071 inclines more upward as it advances toward, for example, a distal end 6010 of the lock insertion part 601.

The engagement portion 600 extends downwardly from, for example, the distal end of the lock insertion part 601. The engagement portion 600 has a hook shape. The engagement portion 600 of this embodiment is exposed from the mounting member 61 as viewed from the depth direction (see FIG. 3A).

The lock projecting part 605 extends, for example, from the entire area in the door opening and closing direction of the upper edge of the lock body 606 of the locking member 60 in the engaging posture (specifically, the entire area of the horizontal portion 6070 of the upper edge) (see FIG. 4A). The lock projecting part 605 of this embodiment extends in the depth direction (for example, toward the platform 3 side).

The first lock through holes 602 are provided in order to connect the mounting member 61 and the sim member 62 with the locking member 60. The first lock through holes 602 are located in the lock insertion part 601. Specifically, the first lock through holes 602 extend through the lock insertion part 601 of the lock body 606 in the plate thickness direction (for example, the direction in which the shaft 350 extends). In this embodiment, the two first lock through holes 602 are arranged in the lock insertion part 601. The two first lock through holes 602 are aligned with each other in the longitudinal direction of the locking member 60. A female screw that can be brought into threaded engagement with each of the first fixing members 63 is formed on the inner periphery defining each of the first lock through holes 602.

The second lock through hole 603 is provided in order to connect the sim member 62 to the locking member 60. The second lock through hole 603 is located at a position different from the positions of the first lock through holes 602 and extends through the lock body 606 in a given direction (for example, in the plate thickness direction of the lock body 606). The second lock through hole 603 of this embodiment is located at a position different from the lock insertion part 601 and extends through the lock body 606 in a given direction. Specifically, the second lock through hole 603 extends through the lock base 607 in a direction parallel to the extending direction of the first lock through holes 602. A female screw that can be brought into threaded engagement with the second fixing member 64 is formed in the inner periphery defining the second lock through hole 603. The second lock through hole 603 of this embodiment has the same shape and size as the first lock through holes 602.

The third lock through hole 604 is provided in order to connect the locking member 60 to the transmission member 363. The third lock through hole 604 is located at a position different from the lock insertion part 601 and extends through the lock body 606 in a given direction (for example, in the plate thickness direction of the lock body 606). Specifically, the third lock through hole 604 extends through the lock base 607 in a direction parallel to the extending direction of the first lock through holes 602. The third lock through hole 604 is located between the shaft 350 and the second lock through hole 603 in the door opening and closing direction. The third lock through hole 604 of this embodiment is a circular hole. The inner diameter of the third lock through hole 604 is larger than the root diameter of the first lock through holes 602 and the root diameter of the second lock through hole 603.

The sim member 62 is a member for filling a gap between the locking member 60 and the mounting member 61 (see FIG. 3B). Also, the sim member 62 is a member for absorbing dimension errors between the locking member 60 and the mounting member 61. Multiple sim members 62 are prepared to respectively have different thicknesses. Among the sim members 62, one fitted to the sizes of the locking member 60 and the mounting member 61 is selected, and the selected sim member 62 is mounted to the locking member 60. With the gap between the locking member 60 and the mounting member 61 filled with the sim member 62 as described above, it is possible to secure a reliable or improved mount strength of the mounting member 61 to the locking member 60 in the width direction of the slit 610 (in the depth direction of the slit 610 in this embodiment). In other words, a strength required for the mounting can be obtained by the sim member 62 that fills the gap between the locking member 60 and the mounting member 61.

Further, the sim member 62 is inserted into the slit 610, while being overlapped with the lock insertion part 601 in the width direction of the slit 610. The sim member 62 of this embodiment includes a sim insertion part 623 which is a part of the sim member 62 and is configured to be inserted into the slit 610 of the mounting member 61. Specifically, the sim member 62 includes the sim insertion part 623 which is one end of the sim member 62 located on one side (right side in FIG. 3B) in the door opening and closing direction, and a sim base 624 located on the other end side (left side in FIG. 3B) in the door opening and closing direction.

Figure 5:
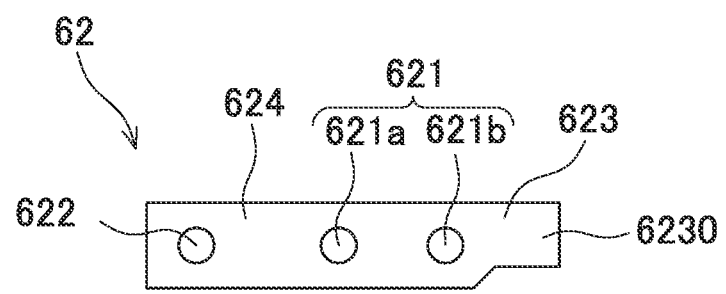
FIG. 5 is a front view for illustrating a configuration of a sim member of the door interlock.

As shown in FIG. 5, the sim member 62 also has a first sim through hole 621. The sim member 62 of this embodiment has multiple first sim through holes 621 (more specifically, two first sim through holes 621*a*, 621*b*). The sim member 62 also has a second sim through hole 622. The sim member 62 of this embodiment has two second sim through holes 622.

The sim member 62 of this embodiment has a plate shape. The sim member 62 has, for example, an elongated shape. Specifically, the sim member 62 has a substantially rectangular plate shape in which a portion located on the lower part of a distal end 6230 of the sim insertion part 623 is partly cut out. The sim member 62 is inserted into the slit 610 of the mounting member 61 having a longitudinal direction coincident with the longitudinal direction of the locking member 60.

The size in the longitudinal direction of the sim member 62 of this embodiment (specifically, the distance between the opposite end edges of the sim member 62 in the longitudinal direction) is 50 mm, for example. The size in the short direction of the sim member 62 (specifically, the distance between the opposite end edges of the sim member 62 in the short direction) is 12 mm, for example.

Multiple sim members 62 are prepared to respectively have different thicknesses. Each of the sim members 62 is designed to have a thickness to be selectable to fit to the sizes of the locking member 60 and the mounting member 61. For example, the sim members 62 respectively have different thicknesses of 0.4 mm, 0.3 mm, and 0.1 mm.

The first sim through holes 621 are provided in order to connect the sim member 62 to the locking member 60 and the mounting member 61. When the sim member 62 is overlapped with the locking member 60, the first sim through holes 621 extend through the sim member 62 at positions overlapping with the first lock through holes 602 in the same direction as the first lock through holes 602.

The first sim through holes 621 of this embodiment are located in the sim insertion part 623. The two first sim through holes 621 are arranged in the sim insertion part 623. The two first sim through holes 621*a*, 621*b* are aligned with each other in the door opening and closing direction. The first sim through holes 621*a*, 621*b* are aligned with each other in the longitudinal direction of the sim member 62. The first sim through holes 621 of this embodiment are arranged at the center position in the short direction of the sim member 62. The first sim through hole 621 are circular holes.

The second sim through hole 622 is provided in order to connect the sim member 62 to the locking member 60. When the sim member 62 is overlapped with the locking member 60, the second sim through hole 622 extends through the sim member 62 in the same direction as the second lock through hole 603 at a position overlapping with the second lock through hole 603.

The second sim through hole 622 of this embodiment is arranged in a part other than the sim insertion part 623 in the sim member 62. Specifically, the second sim through hole 622 is arranged in the sim base 624. The second sim through hole 622 of this embodiment is arranged at the center position in the short direction of the sim member 62. The second sim through hole 622 is a circular hole. The second sim through hole 622 of this embodiment has the same shape and size as the first sim through hole 621.

The second sim through hole 622 and the first sim through hole 621*a* closest to the second sim through hole 622 are aligned with each other in the door opening and closing direction. The second sim through hole 622 is aligned with the first sim through hole 621*a* in the longitudinal direction of the sim member 62. In this embodiment, the distance in the door opening and closing direction between the second sim through hole 622 and the first sim through hole 621*a* adjacent to the second sim through hole 622 is larger than the distance between the two first sim through holes 621*a*, 621*b*.

The mounting member 61 has a part of a detector 7 that detects whether the landing door 32 is in a locked state (see FIG. 3A). The mounting member 61 has the slit 610 and is mounted to the locking member 60 with the lock insertion part 601 which is a part of the locking member 60, inserted into the slit 610.

The mounting member 61 also has mount through holes 612 that are arranged overlapping with the first lock through hole 602 and the first sim through hole 621 at a position overlapping with the lock insertion part 601 and the sim member 62 and respectively extend through the mounting member 61 in a direction parallel to the extending direction of the first lock through hole 602 and the first sim through hole 621 (see FIG. 3B). The mounting member 61 of this embodiment has two mount through holes 612.

The mounting member 61 of this embodiment has an elongated shape. The mounting member 61 includes a mount body 613 mounted to the locking member 60, and a mount extension part 614 extending from the mount body 613.

The mounting member 61 has a shape symmetric with an imaginary line L passing through a center in the width direction of the slit 610. Thus, the mounting member 61 can be mounted to either one of the two door panels 320 of the center open type.

The mount body 613 has the slit 610. The mount body 613 covers the parts of the locking member 60 and the sim member 62 inserted in the slit 610 (for example, the lock insertion part 601 and the sim insertion part 623). The mount body 613 of this embodiment covers the lock insertion part 601 and the sim insertion part 623 from both sides in the depth direction.

The slit 610 extends, for example, in the door opening and closing direction. The slit 610 also extends in the vertical direction. The width direction of the slit 610 of this embodiment is coincident with the depth direction. The width of the slit 610 is constant in the direction in which the slit 610 extends (for example, in the door opening and closing direction). Only the lock insertion part 601 and the sim insertion part 623 are inserted into the slit 610 of this embodiment.

The mount through holes 612 are located in the mount body 613. The mount through holes 612 are circular holes. The mount through holes 612 of this embodiment are aligned with each other in the longitudinal direction of the mounting member 61.

The mount extension part 614 extends from an end on one side in the door opening and closing direction of the mount body 613 further to the one side. For example, the mount extension part 614 has a plate shape. The size of the mount extension part 614 in the width direction of the slit 610 is smaller than the size of the mount body 613 in the width direction of the slit 610.

A contact 611 is located in the mount extension part 614 (for example, the lower end of the mount extension part 614 located on the lower side when the engaging part 6 is in the engaging posture) (see FIG. 3A). The contact 611 constitutes a part of the detector 7. The contact 611 has a pair of projections respectively projecting downward. The pair of projections are conducted with each other.

The first fixing members 63 are inserted through the first lock through holes 602, the first sim through holes 621, and the mount through holes 612, thereby fixing the mounting member 61 and the sim member 62 to the locking member 60. The first fixing members 63 of this embodiment are screws.

The second fixing member 64 is inserted through the second lock through hole 603 and the second sim through hole 622, thereby fixing the sim member 62 to the locking member 60. The second fixing member 64 of this embodiment is a screw. Specifically, the second fixing member 64 has the same shape and size as the first fixing members 63.

Figure 6A:
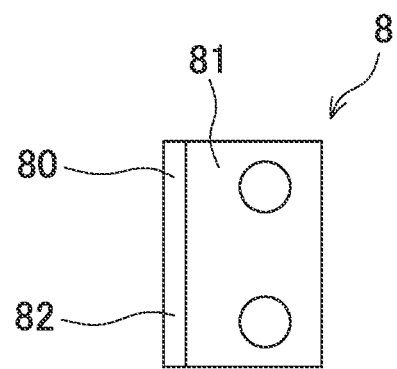
FIG. 6A is a front view of a support member of the door interlock.
Figure 6B:
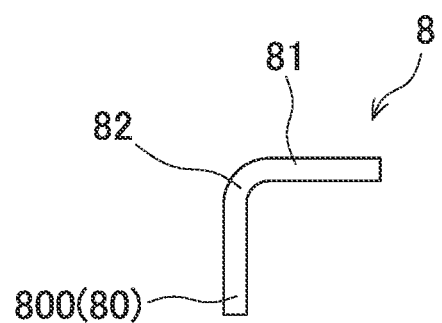
FIG. 6B is a side view of the support member.

The support member 8 is a member that is able to support the locking member from below. The support member 8 includes a support part 80 that is located below the lock projecting part 605 to be able to support the lock projecting part 605 from below when the locking member 60 is in the engaging posture. As shown in FIG. 6A and FIG. 6B, the support member 8 of this embodiment has the support part 80 as an upper end when the locking member 60 is in the engaging posture.

The support member 8 of this embodiment includes a support fixing part 81 that is fixed to the door hanger 35 and a support extension part 82 that extends from the support fixing part 81 in the depth direction. Specifically, the support member 8 is an elongated member. The support member 8 has, for example, an angular shape.

The support fixing part 81 spreads along the surface of the door hanger. The support fixing part 81 is an elongated member.

The support extension part 82 extends, for example, from an end (for example, the entire area of this end) of the support fixing part 81 in the shorter side direction. The support extension part 82 of this embodiment extends from the end on the other side in the door opening and closing direction of the support fixing part 81 (for example, from the end on the left side in FIG. 3B) toward the other end in the depth direction (for example, to the car 12 side).

The support member 80 supports the locking member 60 when the lock projecting part 605 comes into contact with the support part 80 upon the application of a force to the locking member 60. Specifically, when the locking member 60 is bent or curved, the support surface 800, which is an upper surface of the support part 80 when the locking member 60 is in the engaging posture, comes into contact with the lock projecting part 605.

According to the engaging part 6 with the aforementioned configuration, the lock insertion part 601 is in contact with a slit surface 6100, which is a surface defining the slit 610 of the mounting member 61, on one side (specifically, on the platform 3 side) in the width direction of the slit 610 of the mounting member 61. On the other hand, the lock insertion part 601 separates from the slit surface 6100 on the other side (specifically, on the car 12 side) in the width direction of the slit 610 of the mounting member 61.

The sim member 62 is arranged between the lock insertion part 601 and the slit surface 6100 on the other side (specifically, on the car 12 side) in the width direction of the slit 610. That is, the first fixing members 63 fasten together the mounting member 61, the sim member 62, and the locking member 60, which are overlapped with each other in this order from the other side (specifically, from the car 12 side) in the width direction of the slit 610, by screwing them from the other side in the width direction of the slit 610.

The first lock through holes 602 extend through the lock insertion part 601 along the width direction of the slit 610. The second lock thorough hole 603 and the third lock through hole 604 of this embodiment extend through the lock base 607 along the width direction of the slit 610.

The root diameter of the female screw formed in the inner periphery of each of the first lock through hole 602 is smaller than the diameter of each of the first sim through hole 621. The root diameter of the female screw formed in the inner periphery of the second lock through hole 603 is smaller than the diameter of the second sim through hole 622.

The engaged part 5 is a part to be engaged with the locking member 60 when the locking member 60 in the engaging posture (see FIG. 2 and FIG. 3A). The engaged part 5 of this embodiment includes an engaged base 52 fixed to the platform 3 via the guide rail 34, the engaged member 50 extending from the engaged base 52, and a part of the detector 7 provided on the engaged base 52.

The part of the detector 7 provided in the engaged part 5 is, for example, a switch 51. The switch 51 has, for example, a pair of contact points. The switch 51 is arranged at a position enabling the pair of projections of the contact 611 to contact the pair of contact points. The switch 51 of this embodiment is configured to detect that the landing doors 32 are held locked through the conduction of the pair of contact points. Specifically, the pair of contact points are conducted with each other when the engaging part 6 takes the engaging posture to cause the pair of contact points to contact the contact 611.

According to the engaging part 6 of the landing door interlock 4 as described above, the mounting member 61 can be removed from or mounted to the locking member 60 with the sim member 62 held mounted to the locking member 60 for the maintenance or repair of the elevator.

For example, by removing the first fixing members 63 from the first lock through holes 602, the first sim through holes 621, and the mount through holes 612 in the state where the second fixing member 64 is held inserted and screwed into the second sim through hole 622 and the second lock through hole 603, the mounting member 61 can be removed from the locking member 60 with the sim member 62 held mounted to the locking member 60. Therefore, the sim member 62 can be prevented from dropping off from the locking member 60 in the removal of the mounting member 61.

Further, by inserting the first fixing members 63 into the first lock through holes 602, the first sim through holes 621, and the mount through holes 612 in the state where the second fixing member 64 is held inserted and screwed into the second sim through hole 622 and the second lock through hole 603, the mounting member 61 can be mounted to the locking member 60 with the sim member 62 held mounted to the locking member 60. Therefore, the sim member 62 can be prevented from dropping off from the locking member 60 in the mounting of the mounting member 61.

Specifically, in the mounting of the mounting member 61, the sim member 62 having an appropriate thickness is selected based on the thickness of the locking member 60 mounted to the door hanger 35 and the width of the slit 610 of the mounting member 61. The selected sim member 62 is made to overlap with the locking member 60 to have the second sim through hole 622 overlapping with the second lock through hole 603. In this state, the second fixing member 64 is temporarily tightened while being held inserted into the second sim through hole 622 and the second lock through hole 603, thereby allowing the sim member 62 to be temporarily fixed to the locking member 60.

Subsequently, in the state where the mount through holes 612, the first lock through holes 602, and the first sim through holes 621 are positioned to overlap with each other, the lock insertion part 601 of the locking member 60, to which the sim member is temporarily fixed, is arranged in the slit 610 of the mounting member 61. In this state, the first fixing members 63 are inserted and screwed into the first lock through holes 602, the first sim through holes 621, and the mount through holes 612, thereby causing the first fixing members 63 to fix the sim member 62 and the mounting member 61 to the locking member 60. Lastly, the second fixing member 64 which is held inserted into the second sim through hole 622 and the second lock through hole 603 is finally tightened, thereby causing the second fixing member 64 to fix the sim member 62 to the locking member 60.

As described above, the dimension errors of the locking member 60 or the mounting member 61 can be absorbed by selecting the sim member 62 having a dimension fitting to the gap between the locking member 60 and the mounting member 61, and inserting the selected sim member 62 into the slit 610.

According to the landing door interlock 4 of this embodiment, the removal and mounting of the second fixing member 64 can be made in the state where the first fixing member 63 is held inserted into the first lock through hole 602, the first sim through hole 621, and the mount through hole 612. Thus, the workability for the removal and mounting of the mounting member 61 is improved. For example, according to the configuration where the second lock through holes 603 are arranged at the positions different from the lock insertion part 601 of the locking member 60, and the second sim through hole 622 is arranged at the position different from the sim insertion part 623 of the sim member 62, the position where the second fixing member 64 temporarily fixes the locking member 60 and the sim member 62 is prevented from being hidden by the mounting member 61. Therefore, the temporary fixture of the sim member 62 to the locking member 60 using the second fixing member 64 and the fixture of the mounting member 61 to the locking member 60 using the first fixing members 63 can be performed whichever is performed first.

Further, according to the landing door interlock 4 of this embodiment, the support member 8 includes the support part 80 that supports the lock projecting part 605 when the locking member 60 is in the engaging posture. Thereby, the support member 8 can support the locking member 60 when the locking member 60 is in the engaging posture. Therefore, the locking member 60 is hardly deformed even if a force is applied to the locking member 60 from above, and hence can be suppressed from being damaged.

Moreover, according to the landing door interlock 4 of this embodiment where the plate-shaped lock projecting part 605 extends from the plate-shaped lock body 606 in the direction orthogonal to the plane direction of the lock body 606, the stiffness of the locking member 60 can be improved.

According to the landing door interlock 4 of this embodiment, only the one second lock through hole 603 and only one second sim through hole 622 are arranged. That is, the fixing of the sim member 62 to the locking member by the second fixing member 64 is made at only the one place. Therefore, in the case where the mounting member 61 is mounted to the locking member 60 with the sim member 62 temporarily fixed thereto in advance for assembling the door interlock, the positioning of the mounting member 61 relative to the locking member 60 and the sim member 62 can be easily adjusted.

Further, according to the landing door interlock 4 of this embodiment, the first lock through hole 602 and the second lock through hole 603 are screw holes, and the first sim through hole 621 and the second sim through hole 622 are circular holes. The root diameters of the screw holes (the first lock through hole 602 and the second lock through hole 603) are smaller than the diameters of the circular holes (the first sim through hole 621 and the second sim through hole 622) respectively. Therefore, at the time of assembly of the landing door locking mechanism 4, even if, for example, any through hole provided in the sim member 62 or the locking member 60 has dimension errors due to errors in manufacturing, a corresponding fixing member can be easily inserted through the through hole, thereby enabling the sim member 62 to be easily fixed to the locking member 60.

Moreover, according to the landing door interlock 4 of this embodiment, the first fixing members 63 fasten together the mounting member 61, the sim member 62, and the locking member 60, which are overlapped with each other in this order from the other side (specifically, from the car 12 side) in the width direction of the slit 610, by screwing them from the other side in the width direction of the slit 610. Therefore, the mounting member 61 can be mounted to and removed from the car 12 side (elevator shaft 11 side), and, the workability is thus improved.

The door interlock according to the present invention is not limited to the aforementioned embodiment, and it is a matter of course that various modifications can be made without departing from the gist of the present invention. For example, the configuration of a particular embodiment can be added to the configuration of another embodiment, and a part of the configuration of a particular embodiment can be replaced with the configuration of another embodiment. In addition, a part of the configuration of a particular embodiment can be eliminated.

The door interlock 4 of the aforementioned embodiment is the landing door interlock, but may be a car door interlock. In the door interlock 4 of such a type (car door interlock), the engaged part 5 is fixed to the car 12, the engaging part 6 is fixed to the door (car door 122) that opens and closes the entrance 120 of the car 12 and configured to engage with the engaged part 5, thereby locking the car doors 122 in the door closed state.

In the door interlock 4 of the aforementioned embodiment, the first fixing member 63 and the second fixing member 64 are screws, but may be parts or members other than the screws as long as they are configured to fix the corresponding parts or members in position while being inserted into the corresponding through holes. For example, the first fixing members 63 and the second fixing member 64 may be composed of a combination of a bolt and a nut, or a rivet, a split pin, or the like. The engaging part 6 is provided with one second fixing member 64, but may be provided with a plurality of second fixing members 64.

In the door interlock 4 of the aforementioned embodiment, the first lock through holes 602 and the second lock through hole 603 have the same shape and size, but may respectively have different shapes and sizes. Further, the first sim through holes 621 and the second sim through hole 622 have the same shape and size, but may respectively have different shapes and sizes.

For example, the first sim through holes 621 and the second sim through hole 622 may have different shapes and sizes, as long as the mounting member 61 and the sim member 62 can be fixed to the locking member using the first lock through hole 602, and the sim member 62 can be fixed to the locking member 60 using the second lock through holes 603. Therefore, the first lock through holes 602 may be formed to be larger than the second lock through hole 603, for example. In this case, the mounting member 61 and the sim member 62 are fixed to the locking member using the first fixing members 63 each being larger than the second fixing member 64, so that a reliable strength for the fixture can be secured.

In the door interlock 4 of the aforementioned embodiment, only the sim member 62 and the locking member 60 are inserted into the slit 610 of the mounting member 61, but an additional part or member may be inserted.

Further, in the door interlock 4 of the aforementioned embodiment, the lock insertion part 601 is in contact with the slit surface 6100 of the mounting member 61 on one side (specifically, on the platform 3 side) in the width direction of the slit 610 of the mounting member 61. However, the lock insertion part 601 may be in contact with the slit surface 6100 of the mounting member 61 on the other side (specifically, on the car 12 side) in the width direction of the slit 610. In this case, it is conceivable that the sim member 62 is arranged between the lock insertion part 601 and the slit surface 6100 on the one side (specifically, on the platform 3 side) in the width direction of the slit 610. That is, it is conceivable that the first fixing members 63 fasten together the mounting member 61, the sim member 62, and the locking member 60, which are overlapped with each other in this order from the one side (specifically, from the platform 3 side) in the width direction of the slit 610, by screwing them from the other side in the width direction of the slit 610.

The lock insertion part 601 may be separated from the slit surfaces 6100 on both of the one side (specifically, the platform 3 side) and the other side (specifically, the car 12 side) in the width direction of the slit 610 of the mounting member 61. In this case, it is conceivable that sim members 62 are respectively arranged between the lock insertion part 601 and the slit surface 6100 on the one side (specifically, the platform 3 side) and between the lock insertion part 601 and the slit surface on the other side (specifically, the car 12 side) in the width direction of the slit 610. That is, the engaging part may be provided with two sim members 62.

The plate-shaped lock projecting part 605 of the aforementioned embodiment extends in the direction orthogonal to the plate-shaped lock body 606, but may extend while being inclined at an angle other than 90° relative to the lock body 606.

The locking member 60 of the aforementioned embodiment is provided with the lock projecting part 605, but may be not provided with the lock projecting part 605. For example, the locking member 60 may be composed of only the plate-shaped lock body 606.

The second lock through hole 603 of the aforementioned embodiment is located at the position different from the lock insertion part 601 (for example, in the lock base 607) in the locking member 60, but may be provided in the lock insertion part 601.

The first lock through hole 602 and the second lock through hole 603 of the aforementioned embodiment extend through the locking member 60 in the same direction, but may extend in the different directions. In the case where they extend in the different directions, the first fixing members 63 and the second fixing member 64 extend in the different directions while respectively being inserted into the corresponding through holes.

Figure 7A:
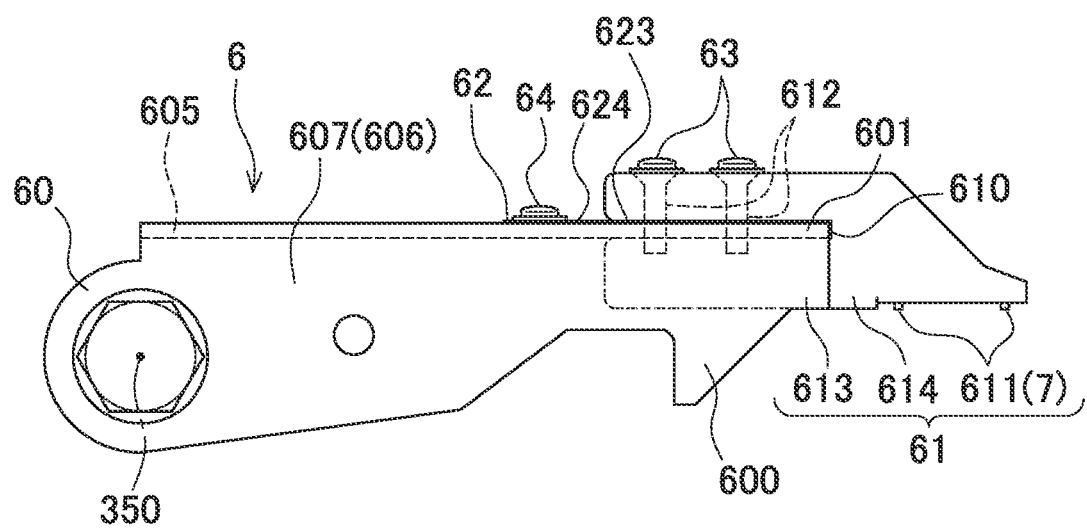
FIG. 7A is a front view of a locking member of a door interlock and surroundings thereof according to a variation.

The mounting member 61 of the aforementioned embodiment covers the locking member 60 and the sim member 62 from both sides in the depth direction, but may cover from both sides in the vertical direction. In this case, it is conceivable that the slit 610 extends in the depth direction while extending in the door opening and closing direction. Further, it is conceivable that the width direction of the slit 610 coincides with, for example, the vertical direction as shown in FIG. 7A and FIG. 7B. In this case, the lock insertion part 601 extends in the depth direction. The lock insertion part 601 in the engaging posture projects, for example, along the horizontal direction. Specifically, the lock insertion part 601 has a plate shape and extends from the lock body 606 in the direction crossing the plane direction of the lock body 606. More specifically, the lock insertion part 601 extends in the direction orthogonal to the plane direction of the lock body 606. The lock insertion part 601 is continuous with the lock projecting part 605. Further, the first fixing members 63 and the second fixing member 64 extend in the width direction (vertical direction) of the slit 610 while respectively being inserted into the corresponding through holes. The slit 610 may extend in the direction inclined both to the vertical direction and to the depth direction while extending in the door opening and closing direction.

The mounting member 61 of the aforementioned embodiment has a part of the detector 7, but may have the entirety of the detector 7.

Figure 8A:
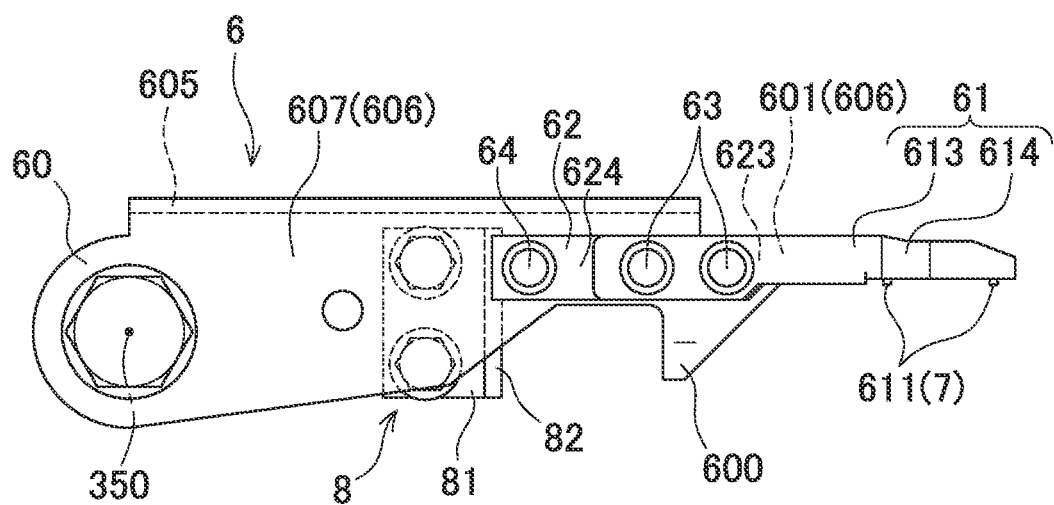
FIG. 8A is a front view of a support member and surroundings thereof according to another variation.
Figure 8B:
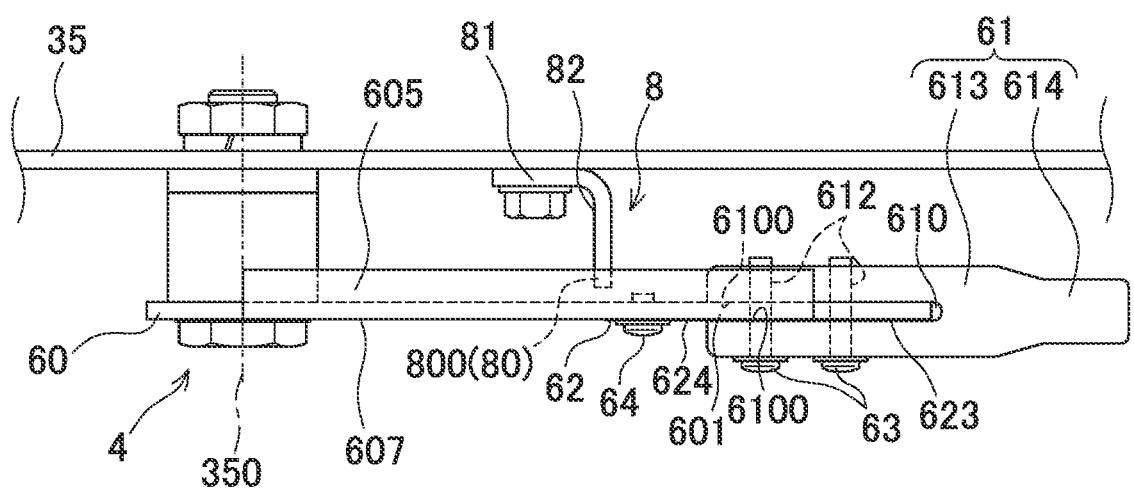
FIG. 8B is a plan view of the support member and the surroundings thereof according to the other variation.

In the door interlock 4 of the aforementioned embodiment, the support member 8 is mounted to the door hanger 35 to have the support extension part 82 extending from an end on one side in the door opening and closing direction of the support fixing part 81 to the other side (for example, to the car 12 side) in the depth direction, but the mounting posture of the support member 8 is not limited to this. For example, as shown in FIG. 8A and FIG. 8B, the support member 8 may be mounted to the door hanger 35 to have the support extension part 82 extending from the end on the other side in the door opening and closing direction of the support fixing part 81 to the other side (for example, to the car 12 side) in the depth direction.

Figure 9A:
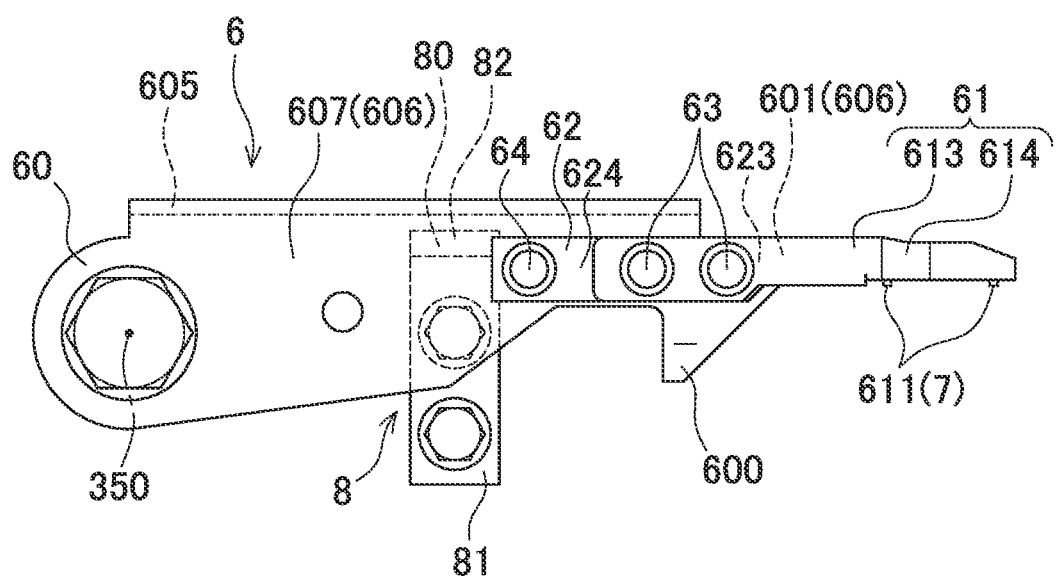
FIG. 9A is a front view of a support member and surroundings thereof according to a variation.
Figure 9B:
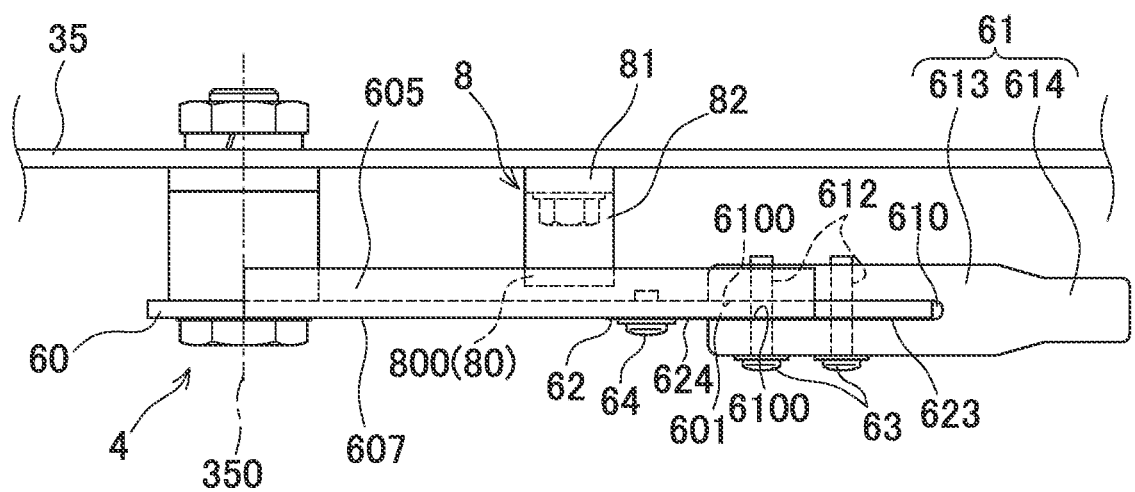
FIG. 9B is a plan view of the support member and the surroundings thereof according to the variation.

As shown in FIG. 9A and FIG. 9B, the support extension part 82 of the support member 8 may have a shape extending from the upper end of the support fixing part 81 to the other side (for example, to the car 12 side) in the depth direction. According to the support member 8, the support extension part 82 entirely serves as the support part 80. Further, the upper surface of the support extension part 82 serves as the support surface 800.

Figure 10A:
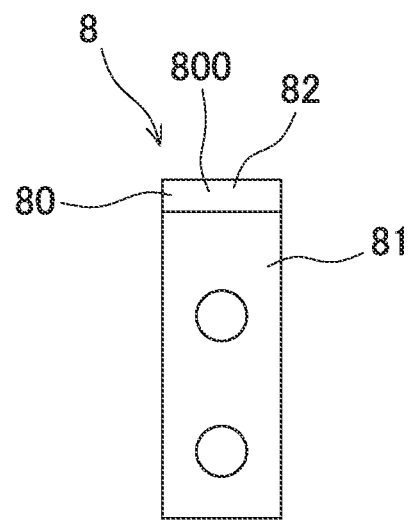
FIG. 10A is a front view of the support member.
Figure 10B:
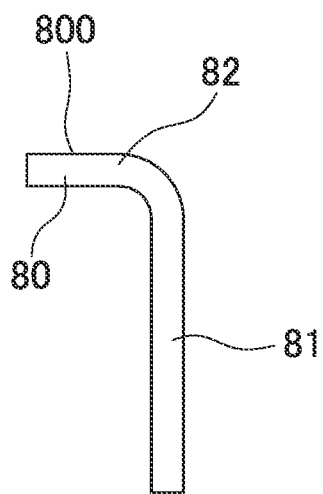
FIG. 10B is a side view of the support member.

The support fixing part 81 of the support member 8 has an elongated shape as shown in FIG. 10A and FIG. 10B. The support extension part 82 extends from an end (for example, from the entire area of this end) in the longitudinal direction of the support fixing part 81.

Figure 11A:
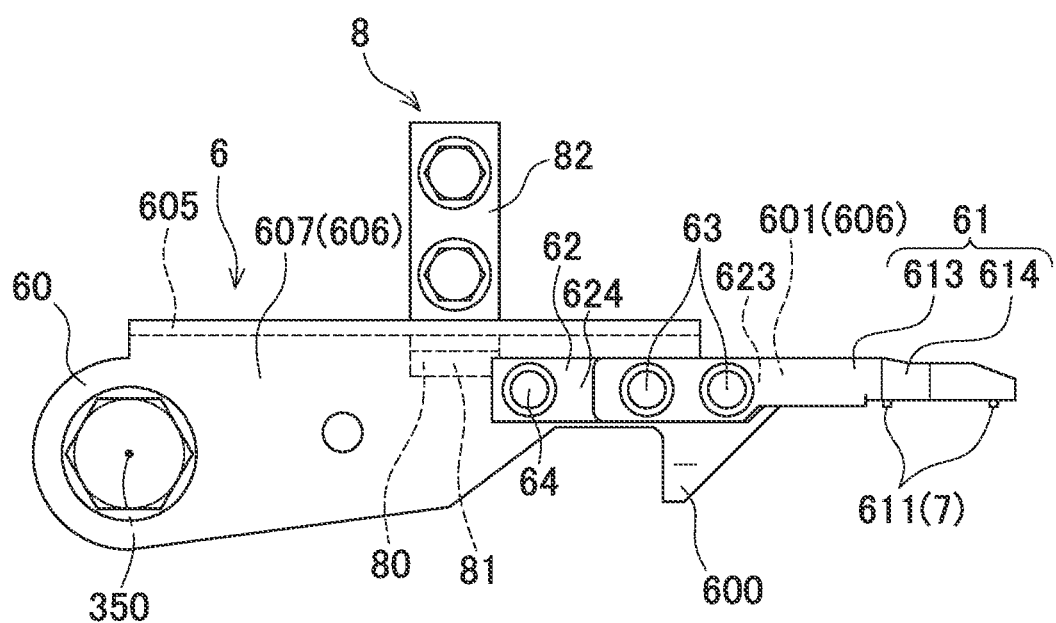
FIG. 11A is a front view of a support member and surroundings thereof according to a variation.
Figure 11B:
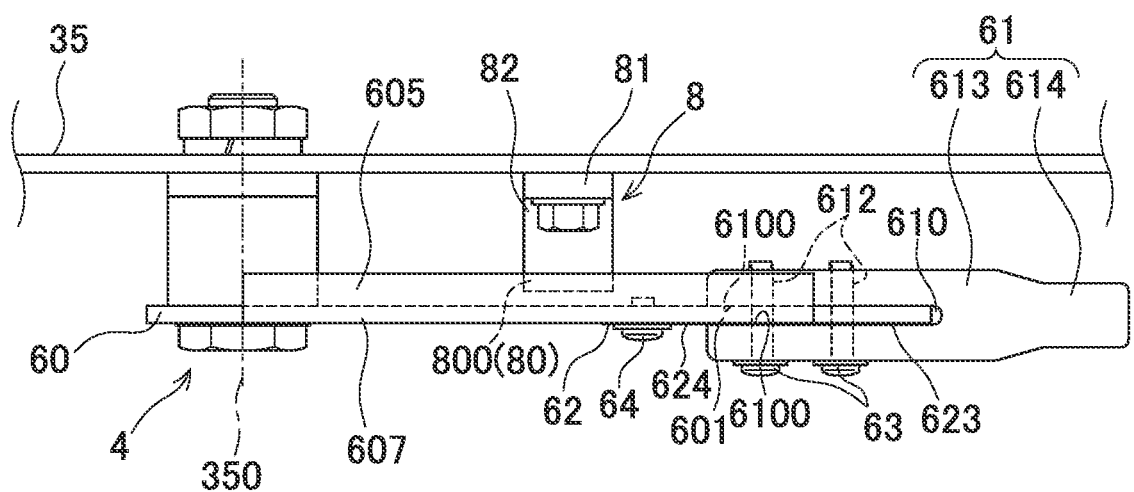
FIG. 11B is a plan view of the support member and the surroundings thereof according to the variation.

The support member 8 reversed upside down may be mounted to the door hanger 35. In this case, the support extension part 82 of the support member 8 has a shape extending from the lower end of the support fixing part 81 to the other side (for example, to the car 12 side) in the depth direction as shown in FIG. 11A and FIG. 11B.

According to the door interlock 4 of the aforementioned embodiment, the support member 8 is fixed to the door hanger 35, but may be fixed to either one of the car 12, the platform 3, the car door 122, or the landing door 32.

According to the door interlock 4 of the aforementioned embodiment, the support member 8 contacts the locking member 60 only when a force is applied to the locking member 60, while being usually out of contact with the locking member 60, but may be constantly in contact with the locking member 60.

Figure 12A:
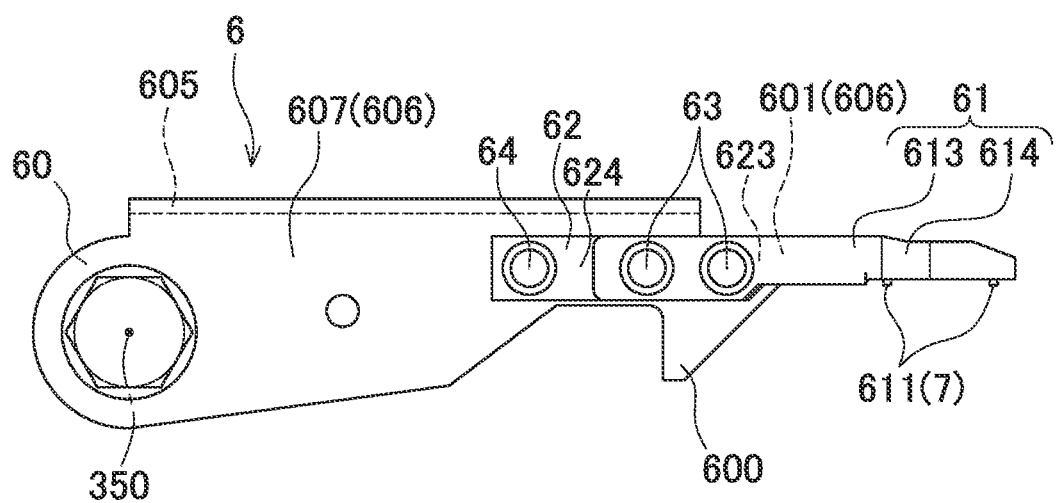
FIG. 12A is a front view of a locking member of a door interlock and surroundings thereof according to a variation.
Figure 12B:
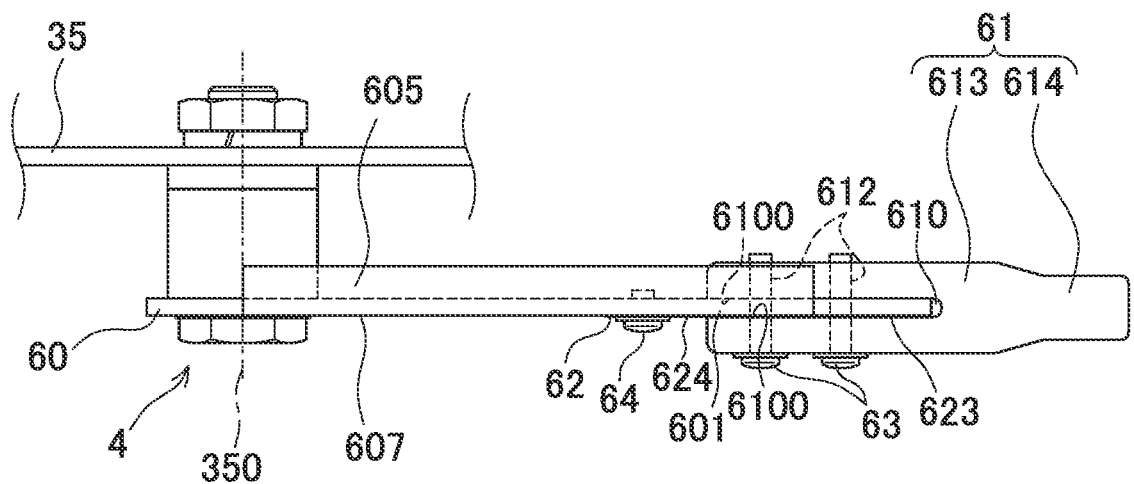
FIG. 12B is a plan view of the locking member and surroundings thereof according to the variation.

The door interlock 4 may not include the support member 8 as shown in FIG. 12 A and FIG. 12B.

The landing door device 33 of the aforementioned embodiments is a so-called center open type door device in which two (a plurality of) landing doors 32 open to both sides in the width direction of the entrance 30, but not limited thereto. The landing door device 33 may be a so-called a single door type door device in which the landing door 32 opens to one side in the width direction of the entrance 30.

The landing doors 32 of the aforementioned embodiment are composed of two doors, but the landing door(s) 32 may be composed of a single door or a plurality of doors such as three or more doors. Same applies to the door(s) provided in the car 12.

As described above, according to the present invention, it is possible to provide a door interlock that enables easy mounting or removing of the parts or members that constitute the locking mechanism.

A door interlock of the present invention including; an engaged part that is fixed to an elevator car or a landing platform; an engaging part that is fixed to a door that opens and closes an entrance of the car or the platform and is configured to engage with the engaged part, thereby locking the door in a door closed state, the engaging part including; a locking member that includes an engagement portion that is connected to the door and engageable with the engaged part; a mounting member that includes a slit and a detector or a part of the detector for detecting whether the door is in an opened state or a closed state, and is mounted to the locking member while having a lock insertion part, which is a part of the locking member, inserted into the slit; a sim member that is inserted into the slit while being overlapped with the lock insertion part in a width direction of the slit; a first fixing member that fixes the mounting member and the sim member to the locking member; and at least one second fixing member that fixes the sim member to the locking member, the locking member including: a first lock through hole that extends through the lock insertion part along the width direction of the slit; and at least one second lock through hole that is located at a position different from the position of the first lock through hole and extends through the locking member in a given direction, the sim member including: a first sim through hole that is located at a position overlapping with the first lock through hole and extends through the sim member in a same direction as the first lock through hole; and at least one second sim through hole that is located at a position overlapping with the at least one second lock through hole and extends through the sim member in a same direction as the at least one second lock through hole, the mounting member including a mount through hole that overlaps with the first lock through hole and the first sim through hole at a position overlapping with the lock insertion part and the sim member and extends through the mounting member in a same direction as the first lock through hole and the first sim through hole, the first fixing member configured to be inserted into the first lock through hole, the first sim through hole, and the mount through hole, thereby fixing the mounting member and the sim member to the locking member, and the at least one second fixing member configured to be inserted into the at least one second lock through hole and the at least one second sim through hole, thereby fixing the sim member to the locking member.

According to this configuration, the first fixing member can be mounted to and removed from the first lock through hole, the first sim through hole, and the mount through hole while having the at least one second fixing member held inserted into the at least one second lock through hole and the at least one second sim through hole. Thereby, the mounting member can be mounted to or removed from the locking member while having the sim member held fixed to the locking member, and therefore the sim member can be prevented from dropping off from the locking member at the time of the mounting or removal of the mounting member.

The door interlock may be configured such that the sim member includes a sim insertion part to be inserted into the slit, and the at least one second sim through hole is arranged at a position different from the sim insertion part of the sim member.

According to this configuration, the at least one second fixing member can be mounted or removed while having the first fixing member held inserted into the first lock through hole, the first sim through hole, and the mount through hole. Thus, the workability at the time of removing and mounting the mounting member can be improved.

The door interlock may be configured such that it further includes a support member that is fixed to either one of the car, the platform, or the door, wherein the locking member is configured to be able to change its posture between an engaging posture in which the engagement portion engages with the engaged part and an unengaging posture in which the engagement portion does not engage with the engaged part, the locking member includes a lock projecting part projecting along a horizontal direction when the locking member is in the engaging posture, and the support member includes a support part that is located below the lock projecting part to be able to support the lock projecting part from below when the locking member 60 is in the engaging posture.

According to this configuration, the support member can support the locking member when the locking member is in the engaging posture, so that the locking member is hardly deformed even if a force is applied to the locking member from above, which can suppress the damage to the locking member.

The door interlock may be configured such that the locking member includes a plate-shaped lock body, and the lock projecting part may have a plate shape and extend from the lock body in a direction crossing a plane direction of the lock body.

According to this configuration, the stiffness of the locking member 60 can be improved since the lock projecting part of the locking member extends from the plate-shaped lock body.

The door interlock may be configured such that the at least one second fixing member includes a single second fixing member, the at least one second lock through hole of the locking member includes a single second lock through hole, and the at least one second sim through hole of the sim member includes a single second sim through hole.

According to this configuration, the fixing of the sim member to the locking member by the at least one second fixing member is made at only the one place. Therefore, in the case where the sim member is temporarily fixed to the locking member and thereafter the mounting member 61 is mounted to these members for assembling the door interlock, the positioning of the mounting member relative to the locking member and the sim member can be easily adjusted.

The door interlock may be configured such that the first lock through hole has an inner periphery defining the first lock through hole and provided with a female screw into which the first fixing member is able to be screwed, the at least one second lock through hole has an inner periphery defining the at least one second lock through hole and provided with a female screw into which the at least one second fixing member is able to be screwed, each of the first sim through hole and the at least one second sim through hole is a circular hole, the female screw formed in an inner periphery of the first lock through hole has a root diameter smaller than a diameter of the first sim through hole, and the female screw formed in an inner periphery of the at least one second lock through hole has a root diameter smaller than a diameter of the at least one second sim through hole.

According to this configuration, even if, for example, any through hole provided in the sim member or the locking member for assembling the door interlock has dimension errors due to errors in manufacturing, a corresponding fixing member can be easily inserted through the through hole, thereby enabling the sim member to be easily fixed to the locking member.

Although the door interlock of this embodiment is as described above, the present invention is not limited to the aforementioned embodiment and the design may be appropriately changed within the scope where the present invention is intended. Also, the functional effect of the present invention is not limited to the aforementioned embodiment. That is, the embodiments disclosed herein should be assumed as not limitations but exemplifications in all aspects. The scope of the present invention is described not by the above description but by the claims. Further, the scope of the present invention is intended to include the scope equivalent to the claims and all the changes in the claims

What is claimed is:

1. A door interlock comprising:
    an engaged part that is fixed to an elevator car or a landing platform;
    an engaging part that is fixed to a door that opens and closes an entrance of the car or the platform and is configured to engage with the engaged part, thereby locking the door in a door closed state,
    the engaging part comprising:
        a locking member that comprises an engagement portion that is connected to the door and engageable with the engaged part;
        a mounting member that comprises a slit and a detector or a part of the detector for detecting whether the door is in an opened state or a closed state, and is mounted to the locking member while having a lock insertion part, which is a part of the locking member, inserted into the slit;
        a sim member that is inserted into the slit while being overlapped with the lock insertion part in a width direction of the slit;
        a first fixing member that fixes the mounting member and the sim member to the locking member; and
        at least one second fixing member that fixes the sim member to the locking member,
    the locking member comprising:
        a first lock through hole that extends through the lock insertion part along the width direction of the slit; and
        at least one second lock through hole that is located at a position different from the position of the first lock through hole and extends through the locking member in a given direction,
    the sim member comprising:
        a first sim through hole that is located at a position overlapping with the first lock through hole and extends through the sim member in a same direction as the first lock through hole; and
        at least one second sim through hole that is located at a position overlapping with the at least one second lock through hole and extends through the sim member in a same direction as the at least one second lock through hole,
    the mounting member comprising a mount through hole that overlaps with the first lock through hole and the first sim through hole at a position overlapping with the lock insertion part and the sim member and extends through the mounting member in a same direction as the first lock through hole and the first sim through hole,
    the first fixing member configured to be inserted into the first lock through hole, the first sim through hole, and the mount through hole, thereby fixing the mounting member and the sim member to the locking member, and
    the at least one second fixing member configured to be inserted into the at least one second lock through hole and the at least one second sim through hole, thereby fixing the sim member to the locking member.

2. The door interlock according to claim 1, wherein
    the sim member comprises a sim insertion part to be inserted into the slit, and
    the at least one second sim through hole is arranged at a position different from the sim insertion part of the sim member.

3. The door interlock according to claim 2, further comprising
    a support member that is fixed to either one of the car, the platform, or the door, wherein
    the locking member is configured to be able to change its posture between an engaging posture in which the engagement portion engages with the engaged part and an unengaging posture in which the engagement portion does not engage with the engaged part,
the locking member comprises a lock projecting part projecting along a horizontal direction when the locking member is in the engaging posture, and
the support member comprises a support part that is located on a lower side of the lock projecting part to be able to support the lock projecting part from the lower side when the locking member is in the engaging posture.

4. The door interlock according to claim 3, wherein
the first lock through hole has an inner periphery defining the first lock through hole and provided with a female screw into which the first fixing member is able to be screwed,
the at least one second lock through hole has an inner periphery defining the at least one second lock through hole and provided with a female screw into which the at least one second fixing member is able to be screwed,
each of the first sim through hole and the at least one second sim through hole is a circular hole,
the female screw formed in an inner periphery of the first lock through hole has a root diameter smaller than a diameter of the first sim through hole, and
the female screw formed in an inner periphery of the at least one second lock through hole has a root diameter smaller than a diameter of the at least one second sim through hole.

5. The door interlock according to claim 3, wherein
the at least one second fixing member comprises a single second fixing member,
the at least one second lock through hole of the locking member comprises a single second lock through hole, and
the at least one second sim through hole of the sim member comprises a single second sim through hole.

6. The door interlock according to claim 3, wherein
the locking member comprises a plate-shaped lock body, and
the lock projecting part has a plate shape and extends from the lock body in a direction crossing a plane direction of the lock body.

7. The door interlock according to claim 6, wherein
the at least one second fixing member comprises a single second fixing member,
the at least one second lock through hole of the locking member comprises a single second lock through hole, and
the at least one second sim through hole of the sim member comprises a single second sim through hole.

8. The door interlock according to claim 6, wherein
the first lock through hole has an inner periphery defining the first lock through hole and provided with a female screw into which the first fixing member is able to be screwed,
the at least one second lock through hole has an inner periphery defining the at least one second lock through hole and provided with a female screw into which the at least one second fixing member is able to be screwed,
each of the first sim through hole and the at least one second sim through hole is a circular hole,
the female screw formed in an inner periphery of the first lock through hole has a root diameter smaller than a diameter of the first sim through hole, and
the female screw formed in an inner periphery of the at least one second lock through hole has a root diameter smaller than a diameter of the at least one second sim through hole.

9. The door interlock according to claim 2, wherein
the at least one second fixing member comprises a single second fixing member,
the at least one second lock through hole of the locking member comprises a single second lock through hole, and
the at least one second sim through hole of the sim member comprises a single second sim through hole.

10. The door interlock according to claim 9, wherein
the first lock through hole has an inner periphery defining the first lock through hole and provided with a female screw into which the first fixing member is able to be screwed,
the at least one second lock through hole has an inner periphery defining the at least one second lock through hole and provided with a female screw into which the at least one second fixing member is able to be screwed,
each of the first sim through hole and the at least one second sim through hole is a circular hole,
the female screw formed in an inner periphery of the first lock through hole has a root diameter smaller than a diameter of the first sim through hole, and
the female screw formed in an inner periphery of the at least one second lock through hole has a root diameter smaller than a diameter of the at least one second sim through hole.

11. The door interlock according to claim 2, wherein
the first lock through hole has an inner periphery defining the first lock through hole and provided with a female screw into which the first fixing member is able to be screwed,
the at least one second lock through hole has an inner periphery defining the at least one second lock through hole and provided with a female screw into which the at least one second fixing member is able to be screwed,
each of the first sim through hole and the at least one second sim through hole is a circular hole,
the female screw formed in an inner periphery of the first lock through hole has a root diameter smaller than a diameter of the first sim through hole, and
the female screw formed in an inner periphery of the at least one second lock through hole has a root diameter smaller than a diameter of the at least one second sim through hole.

12. The door interlock according to claim 1, further comprising
a support member that is fixed to either one of the car, the platform, or the door, wherein
the locking member is configured to be able to change its posture between an engaging posture in which the engagement portion engages with the engaged part and an unengaging posture in which the engagement portion does not engage with the engaged part,
the locking member comprises a lock projecting part projecting along a horizontal direction when the locking member is in the engaging posture, and
the support member comprises a support part that is located below the lock projecting part to be able to support the lock projecting part from below when the locking member is in the engaging posture.

13. The door interlock according to claim 12, wherein
the locking member comprises a plate-shaped lock body, and the lock projecting part has a plate shape and extends from the lock body in a direction crossing a plane direction of the lock body.

14. The door interlock according to claim 13, wherein
the at least one second fixing member comprises a single second fixing member,
the at least one second lock through hole of the locking member comprises a single second lock through hole, and
the at least one second sim through hole of the sim member comprises a single second sim through hole.

15. The door interlock according to claim 13, wherein
the first lock through hole has an inner periphery defining the first lock through hole and provided with a female screw into which the first fixing member is able to be screwed,
the at least one second lock through hole has an inner periphery defining the at least one second lock through hole and provided with a female screw into which the at least one second fixing member is able to be screwed,
each of the first sim through hole and the at least one second sim through hole is a circular hole,
the female screw formed in an inner periphery of the first lock through hole has a root diameter smaller than a diameter of the first sim through hole, and
the female screw formed in an inner periphery of the at least one second lock through hole has a root diameter smaller than a diameter of the at least one second sim through hole.

16. The door interlock according to claim 12, wherein
the at least one second fixing member comprises a single second fixing member,
the at least one second lock through hole of the locking member comprises a single second lock through hole, and
the at least one second sim through hole of the sim member comprises a single second sim through hole.

17. The door interlock according to claim 12, wherein
the first lock through hole has an inner periphery defining the first lock through hole and provided with a female screw into which the first fixing member is able to be screwed,
the at least one second lock through hole has an inner periphery defining the at least one second lock through hole and provided with a female screw into which the at least one second fixing member is able to be screwed,
each of the first sim through hole and the at least one second sim through hole is a circular hole,
the female screw formed in an inner periphery of the first lock through hole has a root diameter smaller than a diameter of the first sim through hole, and
the female screw formed in an inner periphery of the at least one second lock through hole has a root diameter smaller than a diameter of the at least one second sim through hole.

18. The door interlock according to claim 1, wherein
the at least one second fixing member comprises a single second fixing member,
the at least one second lock through hole of the locking member comprises a single second lock through hole, and
the at least one second sim through hole of the sim member comprises a single second sim through hole.

19. The door interlock according to claim 18, wherein
the first lock through hole has an inner periphery defining the first lock through hole and provided with a female screw into which the first fixing member is able to be screwed,
the at least one second lock through hole has an inner periphery defining the at least one second lock through hole and provided with a female screw into which the at least one second fixing member is able to be screwed,
each of the first sim through hole and the at least one second sim through hole is a circular hole,
the female screw formed in an inner periphery of the first lock through hole has a root diameter smaller than a diameter of the first sim through hole, and
the female screw formed in an inner periphery of the at least one second lock through hole has a root diameter smaller than a diameter of the at least one second sim through hole.

20. The door interlock according to claim 1, wherein
the first lock through hole has an inner periphery defining the first lock through hole and provided with a female screw into which the first fixing member is able to be screwed,
the at least one second lock through hole has an inner periphery defining the at least one second lock through hole and provided with a female screw into which the at least one second fixing member is able to be screwed,
each of the first sim through hole and the at least one second sim through hole is a circular hole,
the female screw formed in an inner periphery of the first lock through hole has a root diameter smaller than a diameter of the first sim through hole, and
the female screw formed in an inner periphery of the at least one second lock through hole has a root diameter smaller than a diameter of the at least one second sim through hole.

* * * * *